(12) United States Patent
Yoshida et al.

(10) Patent No.: US 10,289,560 B2
(45) Date of Patent: May 14, 2019

(54) SWITCH MODULE AND STORAGE SYSTEM

(71) Applicant: Toshiba Memory Corporation, Minato-ku (JP)

(72) Inventors: Norikazu Yoshida, Kawasaki (JP); Takashi Yamaguchi, Yokohama (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 145 days.

(21) Appl. No.: 15/267,718

(22) Filed: Sep. 16, 2016

(65) Prior Publication Data
US 2017/0262380 A1 Sep. 14, 2017

Related U.S. Application Data

(60) Provisional application No. 62/306,477, filed on Mar. 10, 2016.

(51) Int. Cl.
*G06F 13/40* (2006.01)
*G06F 12/1009* (2016.01)
*G06F 13/42* (2006.01)

(52) U.S. Cl.
CPC ...... *G06F 12/1009* (2013.01); *G06F 13/4022* (2013.01); *G06F 13/4068* (2013.01); *G06F 13/4282* (2013.01); *G06F 2212/1008* (2013.01); *G06F 2212/152* (2013.01); *G06F 2212/657* (2013.01); *G06F 2213/0026* (2013.01)

(58) Field of Classification Search
CPC combination set(s) only.
See application file for complete search history.

(56) References Cited

U.S. PATENT DOCUMENTS 7,562,176 B2   7/2009   Kloeppner et al.
9,141,571 B2   9/2015   Subramaniyan et al.

FOREIGN PATENT DOCUMENTS

JP   2011-113163   6/2011
JP   4964968      7/2012

OTHER PUBLICATIONS

National Instruments " Introduction to PXImc-Technology for High Performance Test, Measurement & Control Applications", http://www.ni.com/white-paper/12523/en/, 2016, 6 pages.

*Primary Examiner* — Yong J Choe
(74) *Attorney, Agent, or Firm* — Oblon, McClelland, Maier & Neustadt, L.L.P.

(57) ABSTRACT

According to one embodiment, a switch module includes a first port with PCIe/NVMe standard being connectable to a host, second ports with PCIe/NVMe standard being connectable to storage devices respectively, and a controller to make the host recognize the storage devices as a virtual storage device.

16 Claims, 11 Drawing Sheets

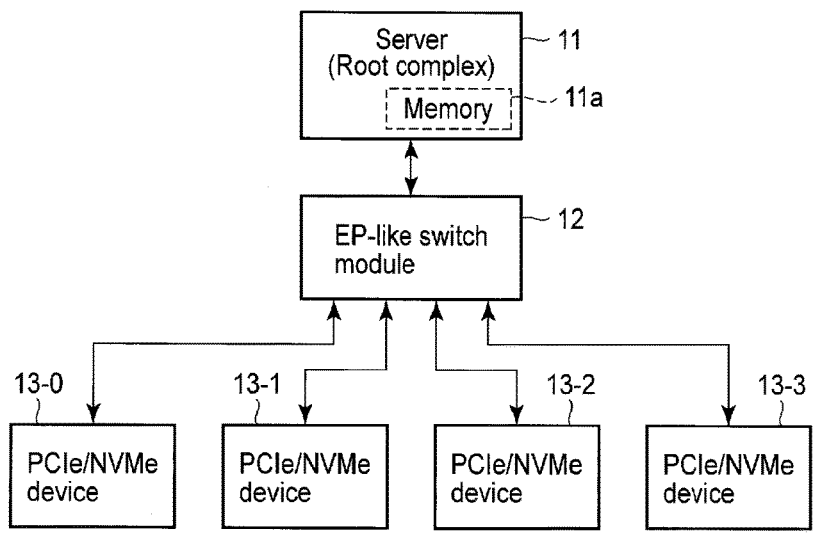
F I G. 1
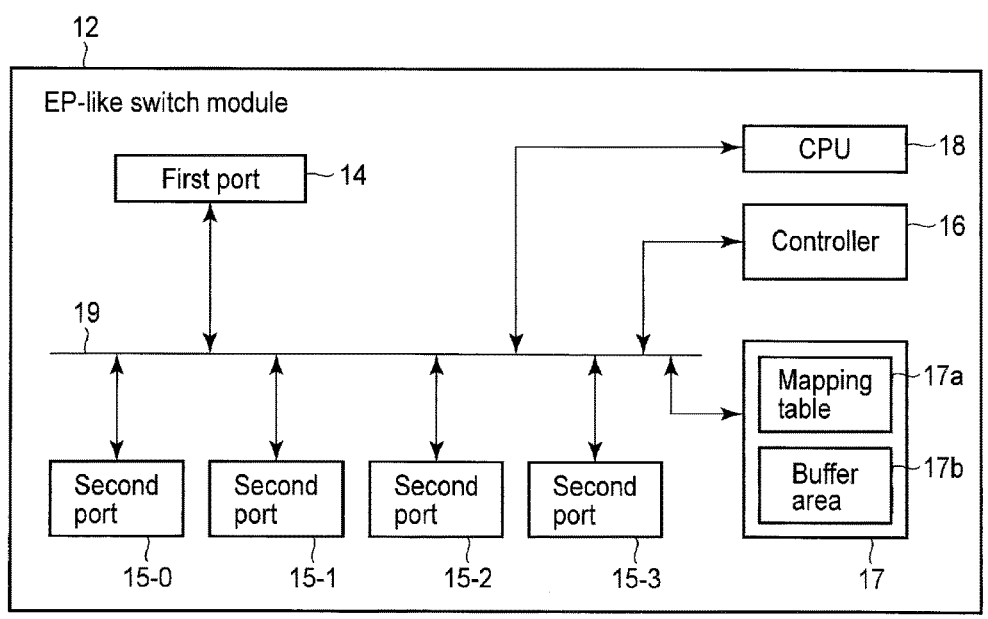
F I G. 2

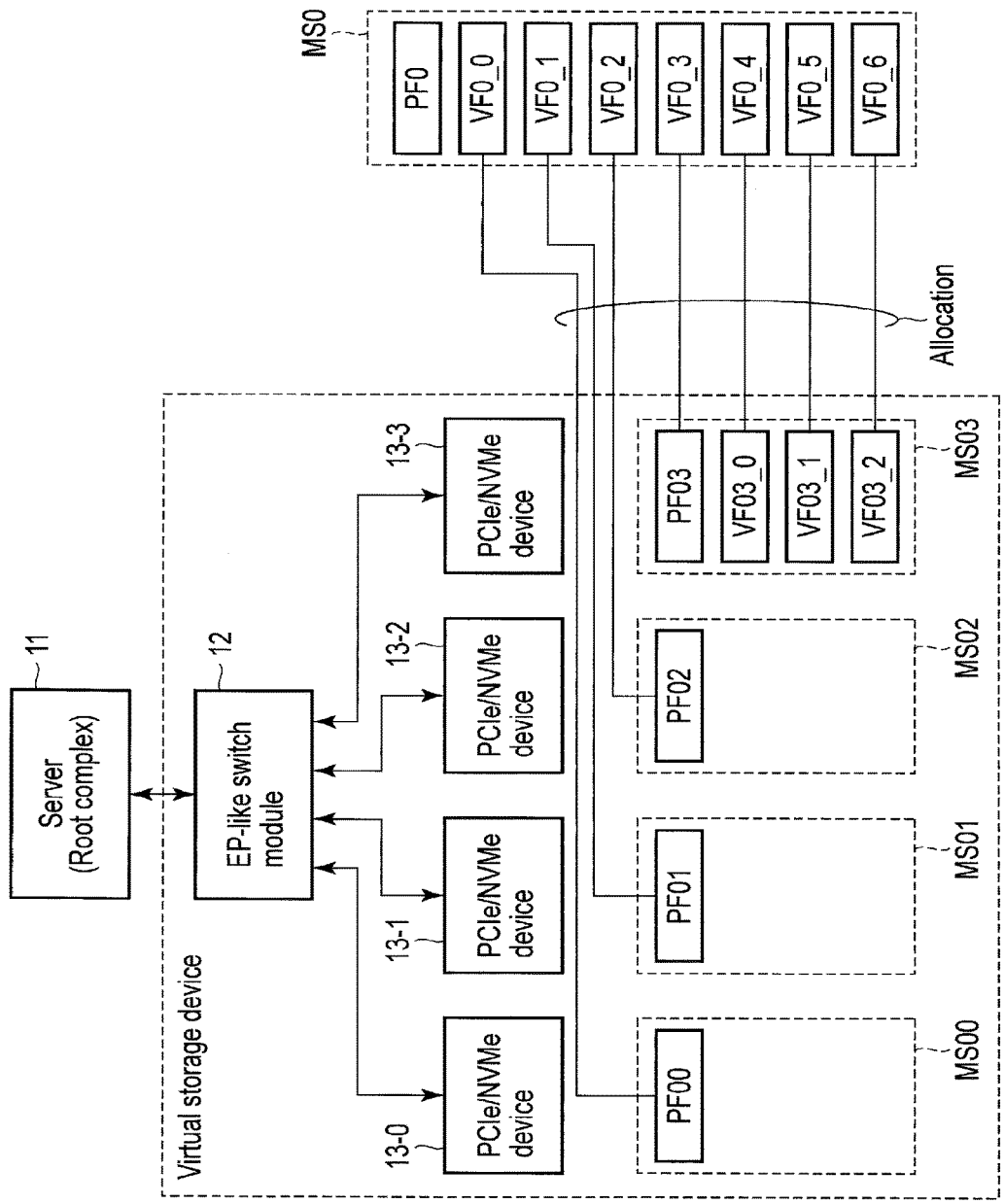
F I G. 3

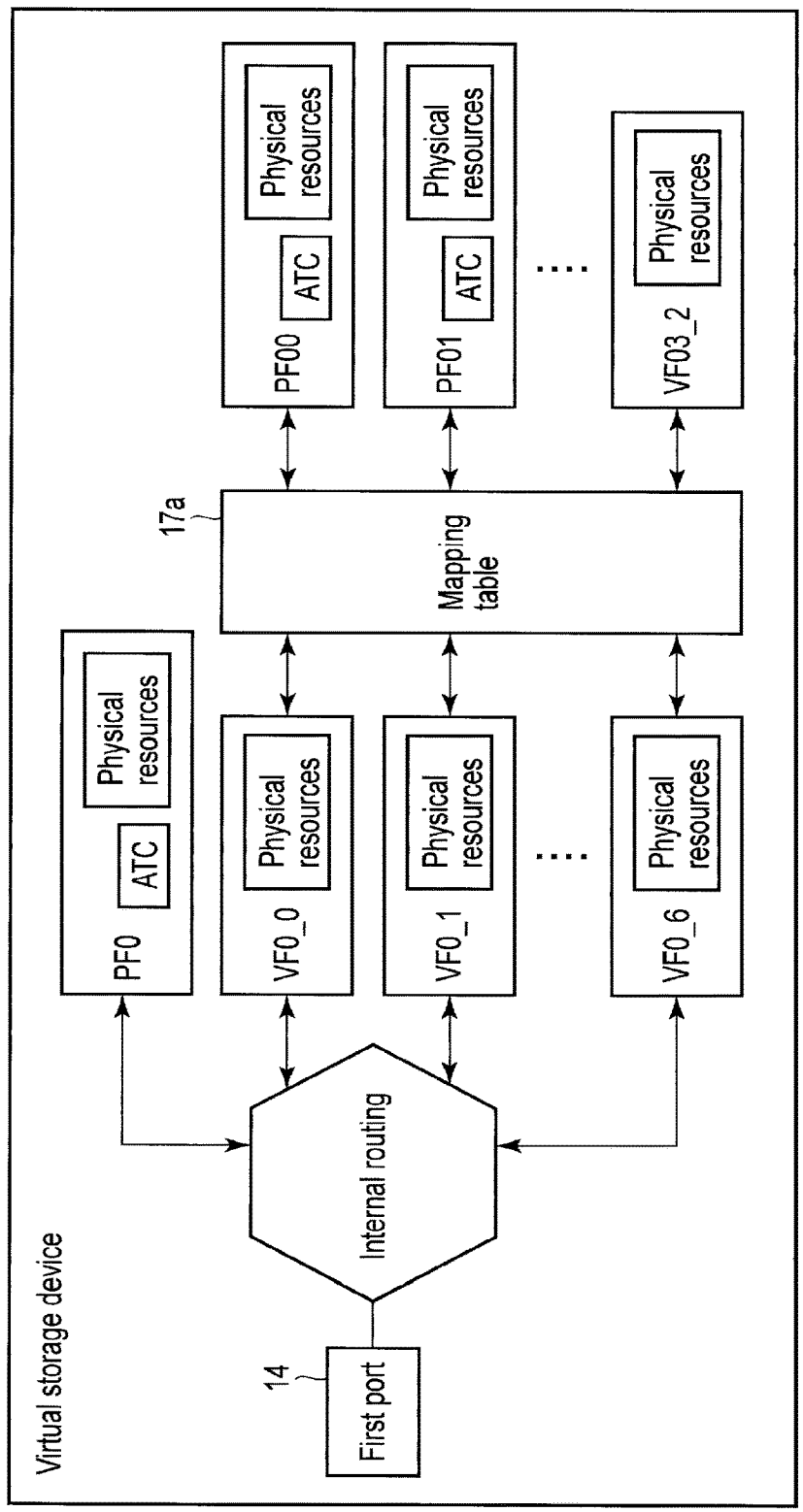
F I G. 4

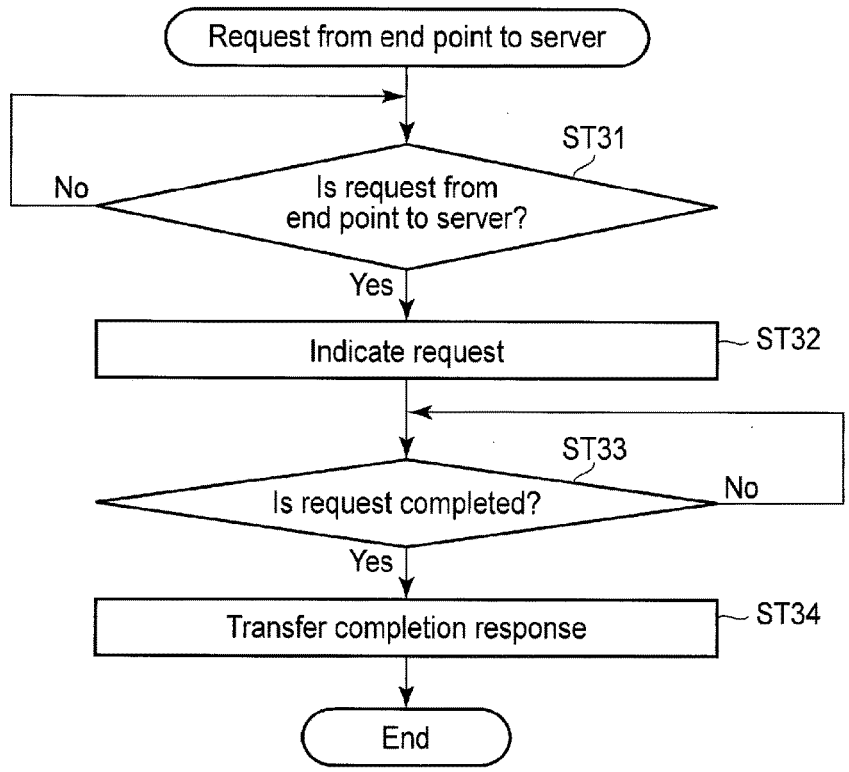
F I G. 12
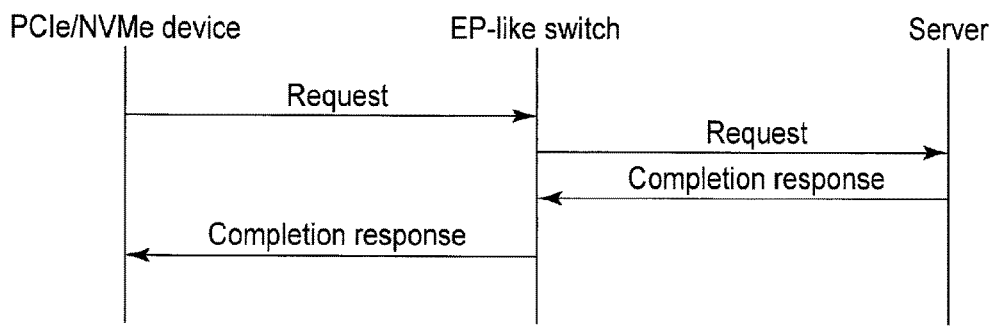
F I G. 13

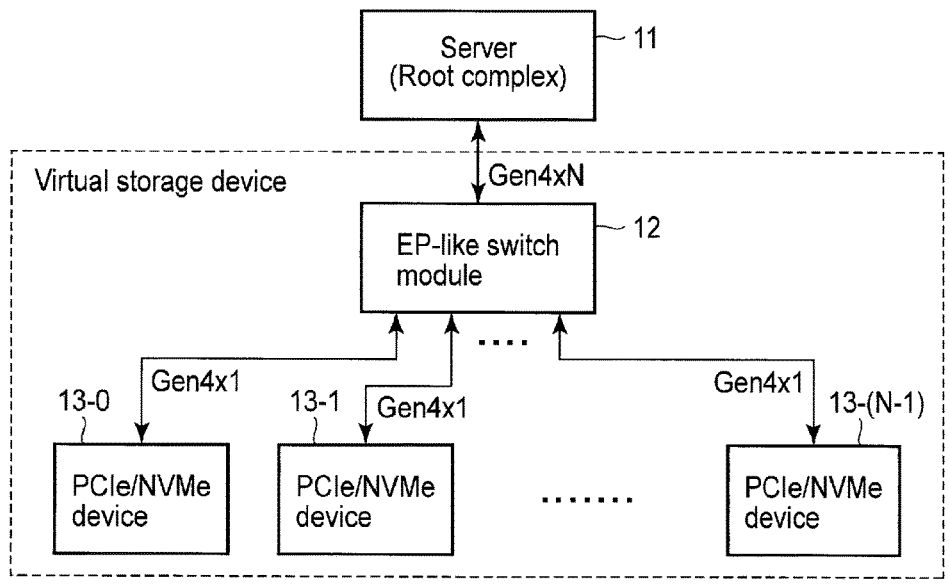
F I G. 14
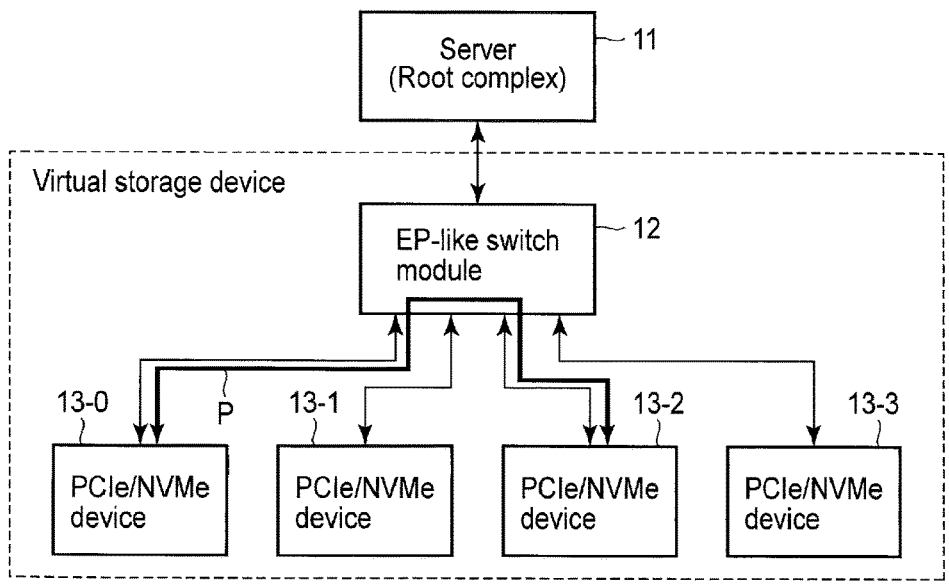
F I G. 15

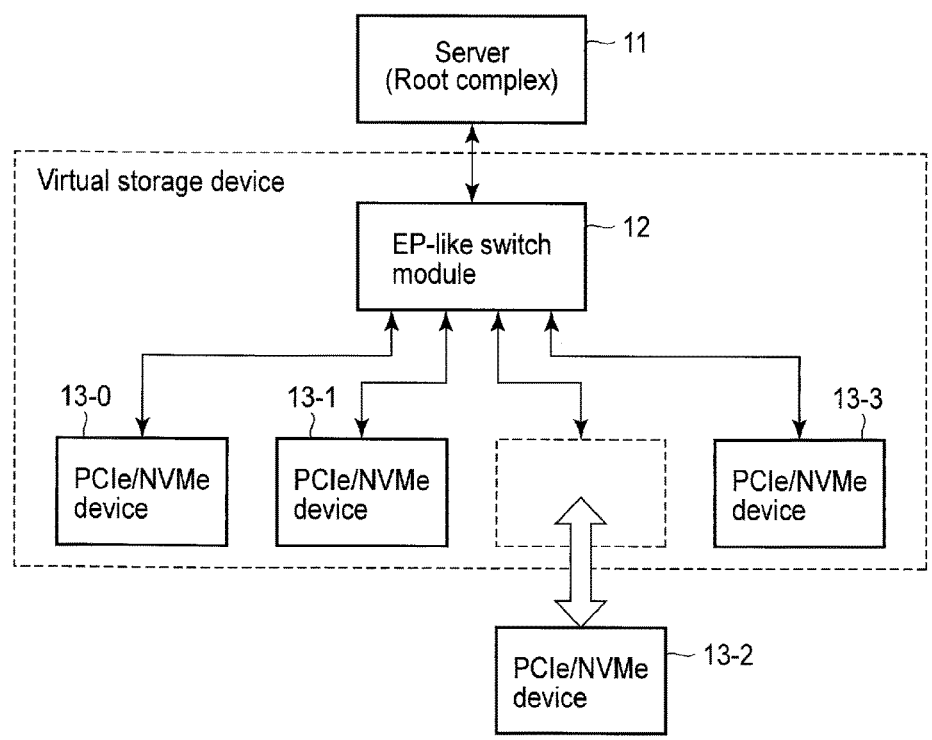
F I G. 16

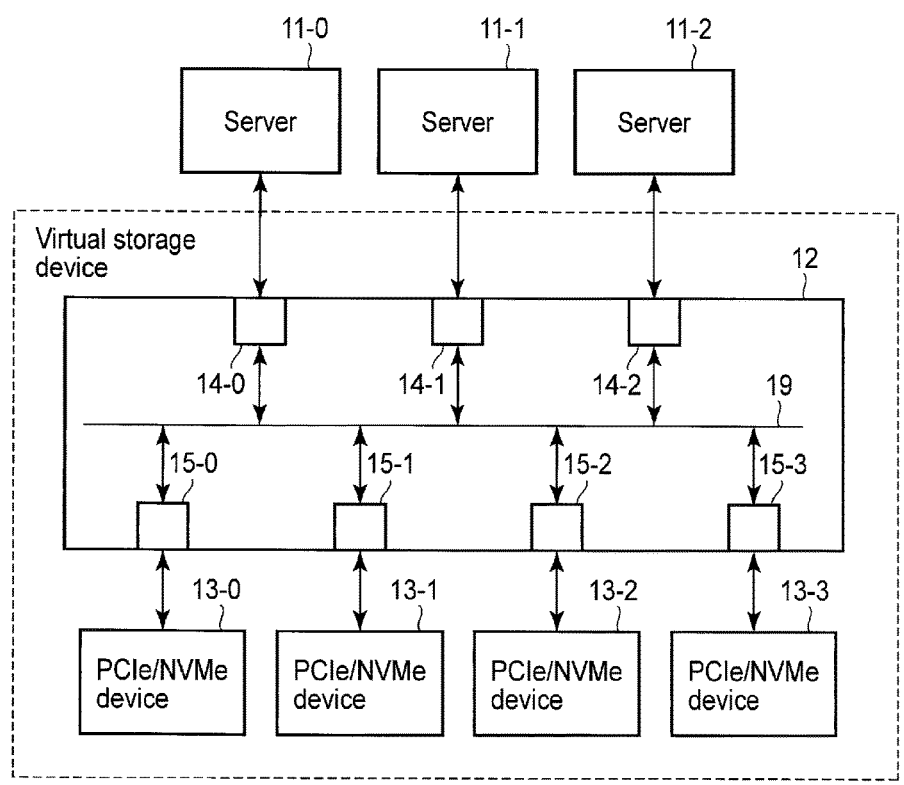
F I G. 17

SWITCH MODULE AND STORAGE SYSTEM

CROSS-REFERENCE TO RELATED APPLICATIONS

This application claims the benefit of U.S. Provisional Application No. 62/306,477, filed Mar. 10, 2016, the entire contents of which are incorporated herein by reference.

FIELD

Embodiments described herein relate generally to a switch module and a storage system.

BACKGROUND

In technical standards such as Serial Advanced Technology Attachment (SATA) and Serial Attached SCSI (SAS), a plurality of storage devices are connected to a host via a Redundant Array of Inexpensive Disks (RAID) controller, for example, such that the host can recognize the storage devices as a single mass storage device. However, such a topology cannot be adopted in the Peripheral Component Interconnect Express (PCIe) standard.

BRIEF DESCRIPTION OF THE DRAWINGS

FIG. 1 shows an example of a storage system.
FIG. 2 shows an example of an EP-like switch module.
FIG. 3 shows an example of a physical function and virtual functions.
FIG. 4 shows a technical concept of routing of transactions.
FIG. 12 shows an example of a flow of sending a request from the endpoint to the server.
FIG. 13 shows an example of command transference between the server, EP-like switch module, and PCIe/NVMe device, executed in the flow of FIG. 12.
FIG. 14 shows a first example.
FIG. 15 shows a second example.
FIG. 16 shows a third example.
FIG. 17 shows a fourth example.

DETAILED DESCRIPTION

Figure 5:
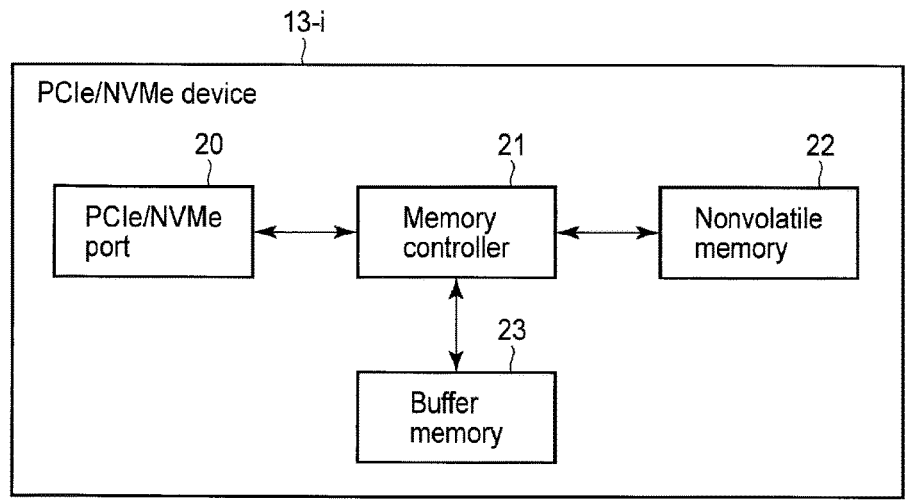
FIG. 5 shows an example of a PCIe/NVMe device.

In general, according to one embodiment, a switch module comprises: a first port with PCIe/NVMe standard being connectable to a host; second ports with PCIe/NVMe standard being connectable to storage devices respectively; and a controller to make the host recognize the storage devices as a virtual storage device.

Embodiment

An interface of a storage device such as SSD is generally SATA or SAS. However, in such standards, the bandwidth of the interface hinders acceleration of data transfer between a storage device and a host even if the read/write performance of the storage device is improved. In consideration of this point, the PCIe standard allowing high-speed data transfer with lower latency and higher extensibility, and the Non-volatile Memory Express (NVMe) standard used to handle a non-volatile memory (storage memory) on an interface conforming to the PCIe standard have now become mainstream standards for the interface of storage devices.

On the other hand, a server-applicable storage device or the like is required to have a greater storage capacity. In that case, since the storage capacity of a storage device is limited, a topology whereby a plurality of storage devices is connected to a host (server) via a switch conforming to the PCIe standard or the NVMe standard is used; however, unlike a RAID controller, such a switch does not make the storage devices appear as a single mass storage device to the host. Therefore, the host must manage the storage devices individually, and thus, the work load of the host increases.

Furthermore, in a storage device conforming to the PCIe standard or the NVMe standard (hereinafter referred to as an PCIe/NVMe device), the single root I/O virtualization (SRIOV) standard is adopted occasionally. SRIOV is a technique to create a plurality of new devices based on a single PCIe/NVMe device (one physical resource) and to allocate a plurality of virtual machines to the devices. The SRIOV technique allows one physical resource to be shared by a plurality of virtual machines. This is advantageous because new devices can be added without additional cost.

In the SRIOV technique, a management function of various operations including the PCIe function and SRIOV support function is referred to as a physical function. One PCIe/NVMe device includes one physical function. Furthermore, in the SRIOV technique, a self-management function associated with one physical function is referred to as a virtual function. A plurality of virtual functions can be associated with one physical function.

In consideration of the above, the present embodiment proposes, for example, a switch module which simulates a PCIe/NVMe endpoint. The switch module is disposed between a host and a plurality of PCIe/NVMe devices while functioning as a single storage device (endpoint) with respect to the host. That is, the switch module instructs the host to recognize PCIe/NVMe devices as a single mass storage device. Since the present embodiment can achieve a single mass storage device without increasing the work load of the host, it is effective when used in a storage system such as a server.

Hereinafter, the switch module is referred to as an EP-like switch module.

(Storage System)

FIG. 1 shows an example of a storage system.

The storage system includes, for example, a server 11 as a host, a plurality of PCIe/NVMe devices 13-0, 13-1, 13-2, and 13-3, and an EP-like switch module 12 which is connected to the host and the PCIe/NVMe devices. If the server 11 is a root complex device, the server 11 may include a plurality of PCIe/NVMe ports. Furthermore, the server 11 may be connected to a CPU or a memory.

PCIe/NVMe devices 13-0, 13-1, 13-2, and 13-3 are non-volatile storage devices. For example, PCIe/NVMe devices 13-0, 13-1, 13-2, and 13-3 are solid-state drives (SSDs). In this embodiment, four PCIe/NVMe devices 13-0, 13-1, 13-2, and 13-3 are used; however, the number thereof is not limited to four.

The server 11 may include a memory 11a functioning as a host memory buffer to which PCIe/NVMe devices 13-0, 13-1, 13-2, and 13-3 are accessible. The host memory buffer conforms to the NVMe standard. PCIe/NVMe devices 13-0, 13-1, 13-2, and 13-3 may use the memory 11a in the server 11 freely as, for example, a data cache, or a storage area of a look-up-table (LUT).

The EP-like switch module 12 functions as a single storage device (endpoint) with respect to the host 11. That is, the EP-like switch module 12 instructs the host 11 to recognize PCIe/NVMe devices 13-0, 13-1, 13-2, and 13-3 as a single mass storage device.

For example, as in FIG. 2, the EP-like switch module 12 includes a first port 14 conforming to the PCIe/NVMe standard which is connectable to the server 11, a plurality of second ports 15-0, 15-1, 15-2, and 15-3 conforming to the PCIe/NVMe standard which are connectable to PCIe/NVMe devices 13-0, 13-1, 13-2, and 13-3, respectively, and a controller 16 which instructs the server 11 to recognize PCIe/NVMe devices 13-0, 13-1, 13-2, and 13-3 as a single virtual storage device.

As in FIG. 3, the controller defines, in a memory space MS0, a physical function PF0 of a single virtual storage device and a plurality of virtual functions VF0_0, VF0_1, VF0_2, VF0_3, VF0_4, VF0_5, and VF0_6 which are associated with physical function PF0, and presents these functions to the server 11.

Furthermore, the controller 16 allocates a plurality of functions of PCIe/NVMe devices 13-0, 13-1, 13-2, and 13-3 to virtual functions VF0_0, VF0_1, VF0_2, VF0_3, VF0_4, VF0_5, and VF0_6 of the single virtual storage device.

For example, the controller 16 allocates a physical function PF00 in a memory space MS00 of PCIe/NVMe device 13-0 to virtual function VF0_0 of the virtual storage device, a physical function PF01 in a memory space MS01 of PCIe/NVMe device 13-1 to virtual function VF0_1 of the virtual storage device, a physical function PF02 in a memory space MS02 of PCIe/NVMe device 13-2 to virtual function VF0_2 of the virtual storage device, and a physical function PF03 in a memory space MS03 of PCIe/NVMe device 13-3 to virtual function VF0_3 of the virtual storage device.

Furthermore, the controller 16 allocates a virtual function VF03_0 in memory space MS03 of PCIe/NVMe device 13-3 to virtual function VF0_4 of the virtual storage device, a virtual function VF03_1 in memory space MS03 of PCIe/NVMe device 13-3 to virtual function VF0_5 of the virtual storage device, and a virtual function VF03_2 in memory space MS03 of PCIe/NVMe device 13-3 to virtual function VF0_6 of the virtual storage device.

The same applies to cases where the virtual functions are defined in PCIe/NVMe devices 13-0, 13-1, and 13-2.

A memory 17 and CPU 18 are connected to the controller 16 via a bus 19.

The memory 17 is a volatile memory such as dynamic random access memory (DRAM) or static random access memory (SRAM). The memory 17 may be a nonvolatile memory such as magnetic random access memory (MRAM) or resistance-change random access memory (ReRAM). The memory 17 includes, for example, a mapping table 17a and a buffer area 17b.

The mapping table 17a is a line unit (LUT) which associates the functions of PCIe/NVMe devices 13-0, 13-1, 13-2, and 13-3 to the virtual functions of the virtual storage device.

Using the mapping table 17a, the controller 16 can manage routing of transactions. Here, a transaction is a unit of processes executed by PCIe/NVMe devices 13-0, 13-1, 13-2, and 13-3. Furthermore, routing is a mechanism by which a process of one of PCIe/NVMe devices 13-0, 13-1, 13-2, and 13-3 can be executed by other device.

For example, routing of transactions in the example of FIG. 3 can be conceptualized to FIG. 4. In the virtual storage device, physical function PF0 includes physical resources and a function of address translation cache (ATC). The ATC is a function to accumulate physical addresses (physical resources) converted from logical addresses such that a delay in the processes is reduced. Furthermore, virtual functions VF0_0, VF0_1, VF0_2, VF0_3, VF0_4, VF0_5, and VF0_6 each include physical resources.

Then, virtual functions VF0_0, VF0_1, VF0_2, VF0_3, VF0_4, VF0_5, and VF0_6 and functions PF00, PF01, PF02, PF03, VF03_0, VF03_1, and VF03_2 (as in FIG. 3) are associated with each other referring to the mapping table 17a.

As above, the routing of transactions is achieved.

The buffer area 17b buffers data transference between the server 11 and PCIe/NVMe devices 13-0, 13-1, 13-2, and 13-3.

The CPU 18 controls the operation of the EP-like switch module. The CPU 18 can manage power of PCIe/NVMe devices 13-0, 13-1, 13-2, and 13-3. For example, in order to suppress the power consumption of the storage system, the CPU 18 may back up various data of PCIe/NVMe devices 13-0, 13-1, 13-2, and 13-3 in the memory 17 and then cut power of at least one of PCIe/NVMe devices 13-0, 13-1, 13-2, and 13-3.

(Example of PCIe/NVMe Device)

FIG. 5 shows an example of a PCIe/NVMe device.

A PCIe/NVMe device 13-$i$ ($i$ is an integer of 0 to 3) corresponds to PCIe/NVMe device 13-$i$ in FIG. 1. PCIe/NVMe device 13-$i$ includes a PCIe/NVMe port 20, memory controller 21, nonvolatile memory 22, and buffer memory 23.

The nonvolatile memory 22 is, for example, a NAND flash memory. The device structure of the nonvolatile memory 22 may be either two-dimensional or three-dimensional. The buffer memory 23 is a volatile memory such as DRAM or SRAM. The buffer memory 23 may be a nonvolatile memory such as MRAM or ReRAM. In this embodiment, the buffer memory 23 is disposed outside the memory controller 21; however, it may be disposed inside thereof.

Figure 6:
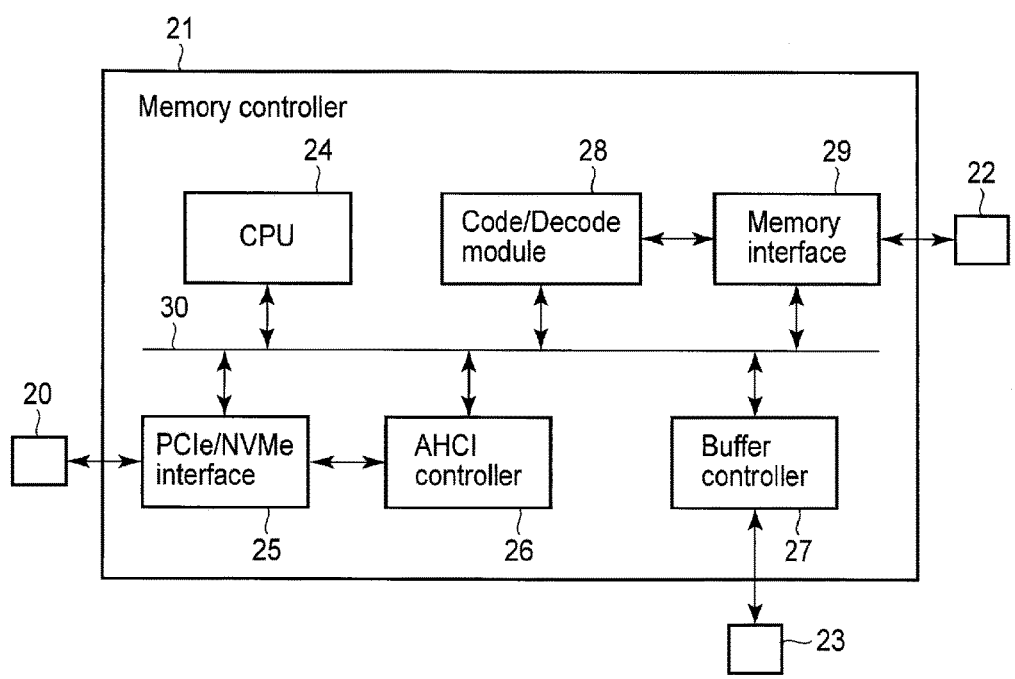
FIG. 6 shows an example of a memory controller.

FIG. 6 is an example of the memory controller 21 of FIG. 5.

The memory controller 21 includes, for example, a CPU 24, PCIe/NVNe interface 25, Advanced Host Controller Interface (AHCI) controller 26, buffer controller 27, coding/decoding module 28, memory interface 29, and bus 30 which connects these elements.

The PCIe/NVMe interface 25 controls data transfer through the PCIe/NVMe port 20 in conformance with the PCIe/NVMe standard. The AHCI controller 26 recognizes the nonvolatile memory 22 as a storage device connected to the host and controls the data transfer between the host and the storage device. The buffer controller 27 functions as an interface to the buffer memory 23.

The coding/decoding module 28 executes coding of write data to the nonvolatile memory 22 and decoding of read data from the nonvolatile memory 22. Coding/decoding schemes are selected optionally. For example, a Reed Solomon (RS), Bose Chaudhuri Hocquenghem (BCH), or low-density parity check (LDPC) coding/decoding scheme can be used.

The memory interface 29 functions as an interface to the nonvolatile memory 22. The memory interface 29 controls data transfer with respect to the nonvolatile memory 22.

The CPU 24 controls read/write operations to the non-volatile memory 22 based on an instruction from the host. Furthermore, the CPU 24 controls operations such as garbage collection and refresh.

Figure 7:
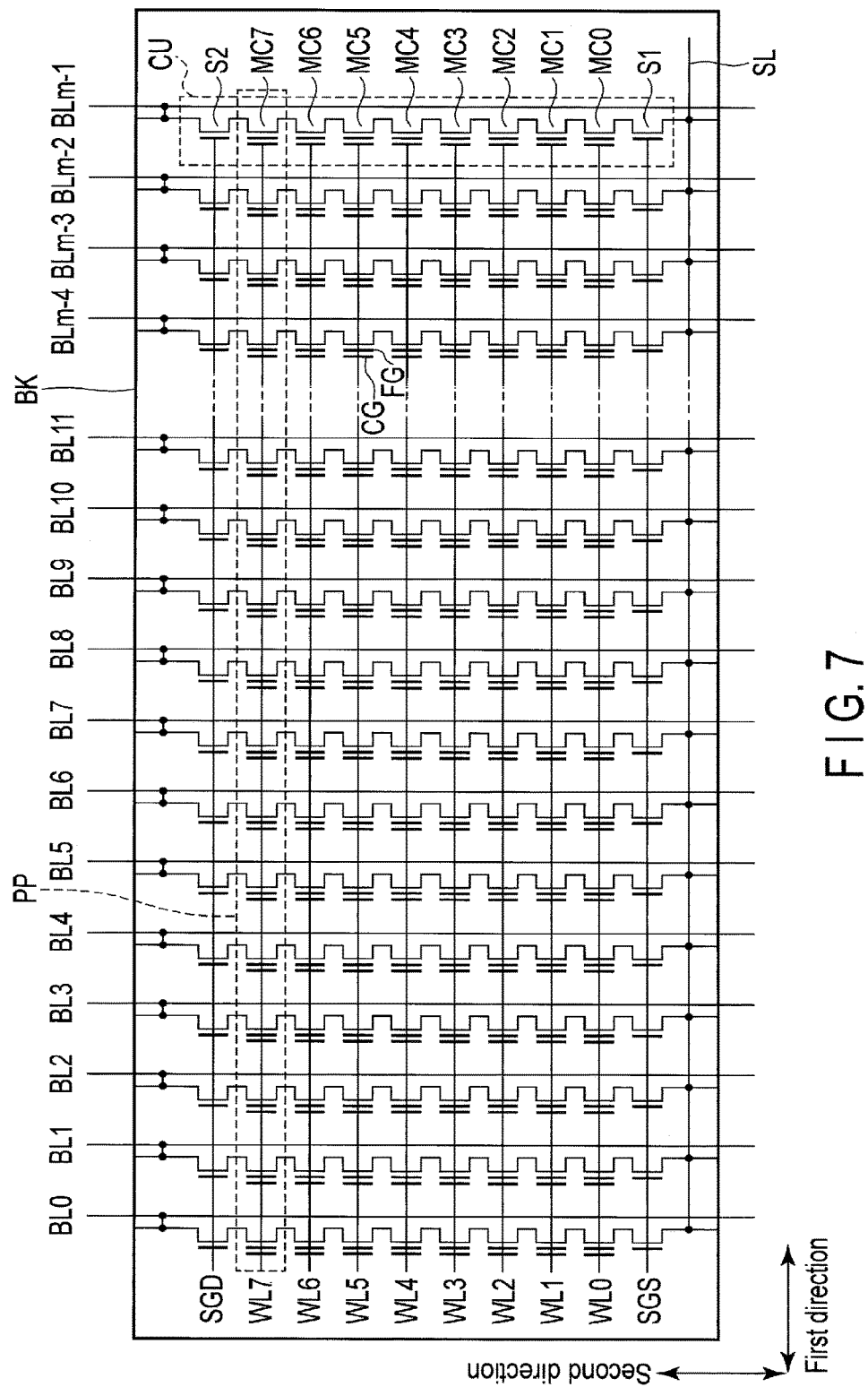
FIG. 7 shows an example of a NAND flash memory.

FIG. 7 shows an example of a NAND flash memory.

The NAND flash memory includes, for example, a block BK.

The block BK includes a plurality of cell units CU arranged in a first direction. Each cell unit CU includes a memory cell string extending in a second direction which crosses the first direction, select transistor S1 connected to one end of a current path of the memory cell string, and select transistor S2 connected to the other end of the current path of the memory cell string. Each memory cell string includes eight memory cells MC0 to MC7 connected in series to the current path.

One memory cell MCk (k is an integer of 1 to 7) includes a charge-storage layer (for example, floating gate electrode) FG and a control gate electrode CG.

In this example, one cell unit CU includes eight memory cells MC0 to MC7; however, no limitation is intended thereby. For example, one cell unit CU may include two or more memory cells such as thirty two or fifty six.

A source line SL is connected to one end of the current path of each memory cell string via select transistor S1. A bit line BLm−1 is connected to the other end of the current path of the memory cell string via select transistor S2.

Word lines WL0 to WL7 are connected in common with control gate electrodes CG of memory cells MC0 to MC7 arranged in the first direction. Similarly, a select gate line SGS is connected in common with gate electrodes of select transistors S1 arranged in the first direction, and a select gate line SGD is connected in common with gate electrodes of select transistors S2 arranged in the first direction.

One physical page (physical address) PP includes m memory cells connected to one word line WLi (i is an integer of 0 to 7).

(Example of Operation)

Now, an example of operation of the above storage system will be explained. Hereinafter, the term controller is used to denote the controller of FIG. 2.

Figure 8:
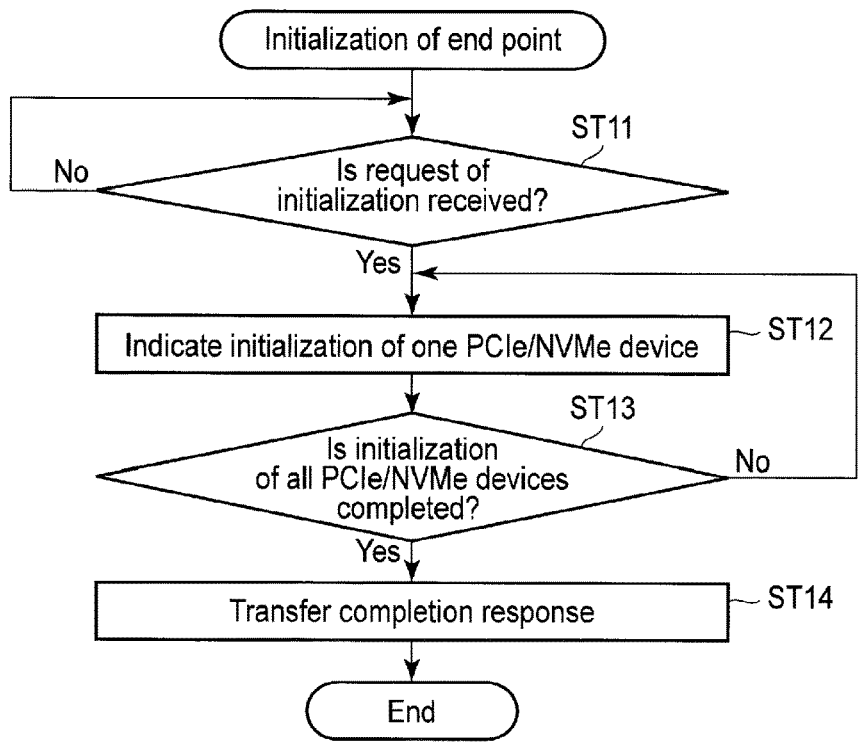
FIG. 8 shows an example of a flow of initialization of an endpoint.
Figure 9:
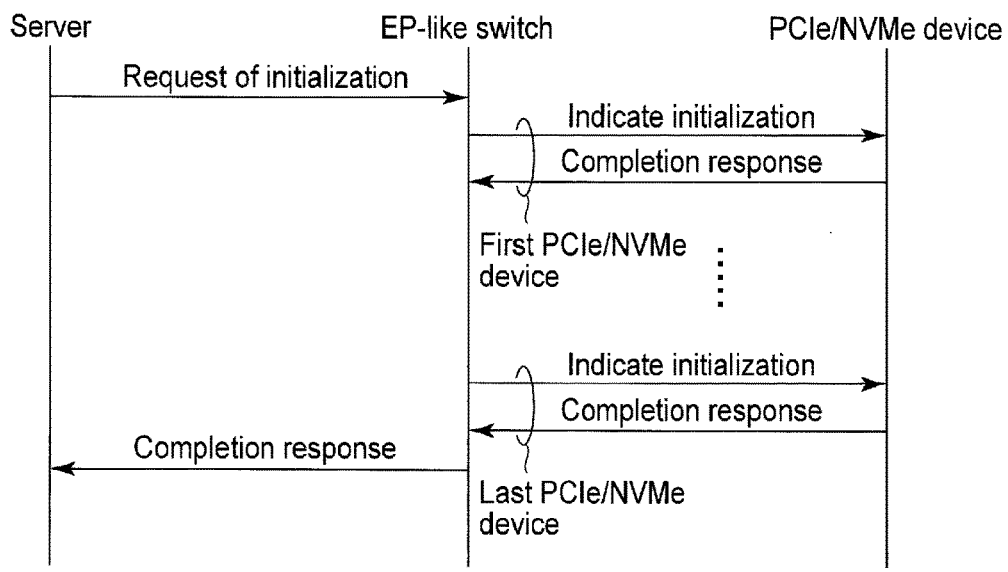
FIG. 9 shows an example of command transference between a server, EP-like switch module, and PCIe/NVMe device, executed in the flow of FIG. 8.

FIG. 8 is a flowchart showing an example of initialization of an endpoint. FIG. 9 shows an example of command transference between the server, EP-like switch module, and PCIe/NVMe device, executed in the flow of FIG. 8.

The controller firstly receives a request of initialization of a virtual storage device (endpoint) from the server as a host, and then instructs the initialization to a plurality of PCI/NVMe devices (storage devices) in order (steps ST11 and ST12).

For example, in the storage system of FIG. 1, the controller instructs initialization of PCIe/NVMe device 13-0 firstly, and upon receipt of a response indicative of completion of the initialization from PCIe/NVMe device 13-0, instructs initialization of PCIe/NVMe device 13-1 next. The controller repeats this operation as to the entire PCIe/NVMe devices 13-0 to 13-3.

Then, after completing the initialization of the entire PCIe/NVMe devices, the controller sends a response indicative of completion to the server as a host (steps ST13 and ST14).

Figure 10:
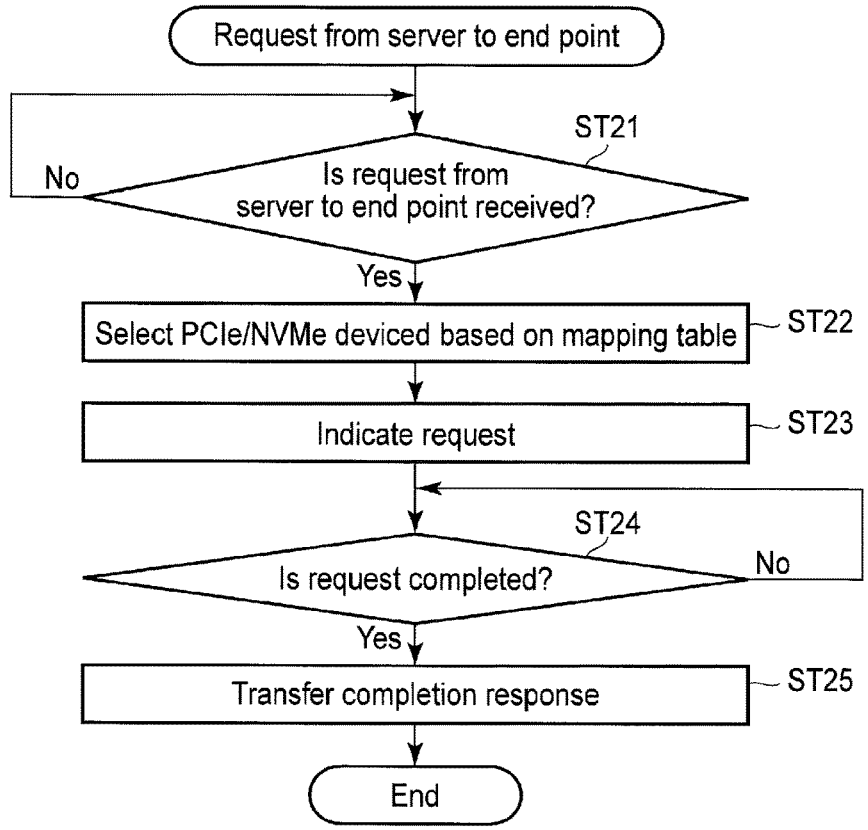
FIG. 10 shows an example of a flow of sending a request from the server to the endpoint.
Figure 11:
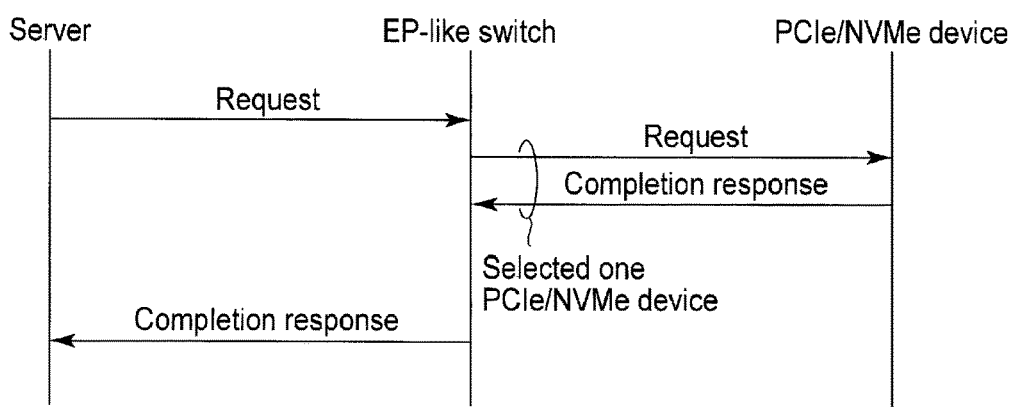
FIG. 11 shows an example of command transference between the server, EP-like switch module, and PCIe/NVMe device, executed in the flow of FIG. 10.

FIG. 10 is a flowchart showing an example of sending a request from the server to the endpoint. FIG. 11 shows an example of command transference between the server, EP-like switch module, and PCIe/NVMe device, executed in the flow of FIG. 10.

The request includes, for example, a request of read/write of user data.

The controller receives a request to the virtual storage device from the server as a host firstly, and selects one of the PCIe/NVMe devices (storage devices) as a target of the request based on the mapping table (steps ST21 and ST22). Furthermore, the controller instructs the selected PCIe/NVMe device to execute the request from the server (step ST23).

Furthermore, after completing the request from the server, the selected PCIe/NVMe device sends a response indicative of completion to the EP-like switch module.

Then, after receiving the response indicative of completion from the selected PCIe/NVMe device, the controller transfers the response indicative of completion to the server as a host (steps ST24 and ST25).

FIG. 12 is a flowchart showing an example of sending a request from the endpoint to the server. FIG. 13 shows an example of command transference between the server, EP-like switch module, and PCIe/NVMe device, executed in the flow of FIG. 12.

The controller receives a request to the server as a host from one of the PCIe/NVMe devices (storage devices) firstly, and instructs the host to execute the request as a request from a virtual storage device (endpoint) (steps ST31 and ST32). The server executes the request, and after completing the request, sends a response indicative of completion to the virtual storage device.

Then, after confirming the completion of the request in the server, the controller transfers the response indicative of completion to the one of the PCIe/NVMe device (steps ST33 and ST34).

EXAMPLES

FIG. 14 shows a first example of the embodiment.

This example relates to the number of lanes (bandwidth).

In the PCIe standard, the number of lanes will be, for example, 1, 2, 4, 8, 12, 16, and 32. In the storage system depicted, data transfer between the server 11 and the EP-like switch 12 should be executed through as many lanes as possible to maximize throughput.

For example, if data transfer between the server 11 and the EP-like switch module 12 is executed through Gen4×N lanes, N PCIe/NVMe devices (storage devices) 13-0 to 13-(N−1) should be connected to the EP-like switch module 12, and data transfer between each PCIe/NVMe device 13-$i$ ($i$ is an integer of 0 to N−1) and the EP-like switch module 12 should be executed in Gen4×1 lane.

Note that Gen4 is a PCIe/NVMe standard related to data transfer speed. Recently, in the PCIe standard, Gen1 (PCIe 1.1), Gen2 (PCIe 2.0), Gen3 (PCIe 3.0), and Gen4 (PCIe 4.0) are available.

FIG. 15 shows a second example.

This example relates to data transference inside the virtual storage device. The EP-like switch module 12 can independently execute data transference with PCIe/NVMe devices (storage devices) 13-0 to 13-3 without involving the server 11.

For example, the quasi-endpoint switch module 12 can execute data transference using a data transference path P, that is, between PCIe/NVMe device 13-0 and PCIe/NVMe device 13-2.

Furthermore, the following operation can be executed in relation to operations such as garbage collection and refresh.

Each PCIe/NVMe device 13-$i$ ($i$ is an integer of 0 to 3) can control operations such as garbage collection and refresh therein using, for example, the memory controller 21 in FIG. 5. Furthermore, the EP-like switch module 12 can control operations such as garbage collection and refresh between PCIe/NVMe devices 13-0, 13-1, 13-2, and 13-3 using, for example, a CPU 18 in FIG. 2.

FIG. 16 shows a third example.

This example relates to a hot plug function.

The EP-like switch module 12 may include a hot plug function. The hot plug function is a function to freely execute addition and removal of PCIe/NVMe devices 13-0, 13-1, 13-2, and 13-3 while power is supplied to the storage system depicted. Note that the addition and removal of PCIe/NVMe devices 13-0, 13-1, 13-2, and 13-3 are managed by the EP-like switch module 12 without involving the server 11.

For example, if PCIe/NVMe device 13-2 is added to the system, the EP-like module 12 increases the capacity of the virtual storage device and notifies the addition of device and increase of capacity to the server 11. Furthermore, if PCIe/NVMe device 13-2 is removed, the EP-like switch module 12 decreases the capacity of the virtual storage device and notifies the removal of device and decrease of capacity to the server 11.

Thus, the server 11 simply recognizes a change in the capacity of the virtual storage device as an endpoint.

FIG. 17 shows a fourth example.

This example relates to multi-root I/O virtualization (MRIOV).

In the above-described embodiment, the EP-like switch module is connected to a single server (root complex); that is, SRIOV is adopted. However, the embodiment can be applied to MRIOV.

For example, the EP-like switch module 12 may be connected to servers 11-0, 11-1, and 11-2. In this example, three servers 11-0, 11-1, and 11-2 are connected are connected to the EP-like switch module 12; however, the number thereof is not limited to three.

The EP-like switch module 12 includes first ports 14-0, 14-1, and 14-2 conforming to the PCIe/NVMe standard which are connected to the bus 19. Servers 11-0, 11-1, and 11-2 are connected to first ports 14-0, 14-1, and 14-2, respectively. Furthermore, the EP-like switch module 12 includes second ports 15-0, 15-1, 15-2, and 15-3 conforming to the PCIe/NVMe standard which are connected to the bus 19. PCIe/NVMe devices 13-0, 13-1, 13-2, and 13-3 are connected to second ports 15-0, 15-1, 15-2, and 15-3.

The bus 19 corresponds to the bus 19 of FIG. 2. That is, the controller 16, memory 17, and CPU 18 in FIG. 2 are connected to the bus 19.

In MRIOV, a single mass storage device can be shared by servers 11-0, 11-1, and 11-2.

CONCLUSION

As can be understood from the above, in the present embodiment, a single mass storage device can be achieved without increasing the work load of the host.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A switch module comprising:
a first port being connectable to a host in accordance with Peripheral Component Interconnect Express/Non-Volatile Memory Express (PCIe/NVMe) standard;
second ports being connectable to storage devices in accordance with the PCIe/NVMe standard respectively; and
a controller configured to make the host recognize the storage devices as a single virtual storage device by
allocating a physical function of each of the storage devices to one of virtual functions of the single virtual storage device,
allocating a virtual function of each of the storage devices to one of the virtual functions of the single virtual storage device, and
showing, to the host,
a physical function of the single virtual storage device, and
the virtual functions of the single virtual storage device.

2. The switch module of claim 1, further comprising a memory storing a mapping table which associates the physical and virtual functions of the storage devices with the virtual functions of the virtual storage device.

3. The switch module of claim 1, wherein the controller defines the physical function and the virtual functions of the virtual storage device and the physical and virtual functions of the storage devices based on Single root I/O virtualization (SRIOV) standard or Multi-root I/O virtualization (MRIOV) standard.

4. The switch module of claim 1, further comprising a memory buffering a data transfer between the host and the storage devices.

5. The switch module of claim 1, wherein the storage devices are accessible to a memory in the host.

6. The switch module of claim 1, further comprising a CPU managing electric powers of the storage devices.

7. The switch module of claim 1, wherein the controller indicates an initialization to the storage devices in series after receiving a request of the initialization of the virtual storage device from the host, and transfers a completion response to the host after completing the initialization of all of the storage devices.

8. The switch module of claim 1, wherein the controller selects one storage device as a target of a request from the storage devices after receiving the request from the host to the virtual storage device, and transfers a completion response to the host after completing the request in the one storage device as the target of the request.

9. The switch module of claim 1, wherein the controller indicates a request to the host after receiving the request from one of the storage devices to the host, and transfers a completion response to one of the storage device after completing the request in the host.

10. The switch module of claim 1, wherein the storage devices are solid state drives (SSDs).

11. A storage system comprising:
a host;
storage devices; and
a switch module connected between the host and the storage devices, the switch module comprises:
- a first port being connectable to the host in accordance with Peripheral Component Interconnect Express/Non-Volatile Memory Express (PCIe/NVMe) standard;
- second ports being connectable to the storage devices in accordance with the PCIe/NVMe standard respectively; and
- a controller configured to make the host recognize the storage devices as a single virtual storage device by
  - allocating a physical function of each of the storage devices to one of virtual functions of the single virtual storage device,
  - allocating a virtual function of each of the storage devices to one of the virtual functions of the single virtual storage device, and
  - showing, to the host,
    - a physical function of the single virtual storage device, and
    - the virtual functions of the single virtual storage device.

12. The storage system of claim 11, wherein
the switch module further comprises a memory storing a mapping table which associates the physical and virtual functions of the storage devices with the virtual functions of the virtual storage device.

13. The storage system of claim 11, wherein
the controller defines the physical function and the virtual functions of the virtual storage device and the physical and virtual functions of the storage devices based on Single root I/O virtualization (SRIOV) standard or Multi-root I/O virtualization (MRIOV) standard.

14. The storage system of claim 11, wherein
the switch module further comprises a memory buffering a data transfer between the host and the storage devices.

15. The storage system of claim 11, wherein
the host comprises a memory to which the storage devices are accessible.

16. The storage system of claim 11, wherein
the switch module further comprises a CPU managing electric powers of the storage devices.

* * * * *